United States Patent [19]

Ryhänen

[11] Patent Number: 5,750,903
[45] Date of Patent: May 12, 1998

[54] METHOD OF LINEARIZING A FLOW VELOCITY SENSOR, A LINEARIZED FLOW VELOCITY MEASUREMENT APPARATUS AND SYSTEM

[75] Inventor: Tapani Ryhänen, Helsinki, Finland

[73] Assignee: Vaisala, Oy, Helsinki, Finland

[21] Appl. No.: 576,313

[22] Filed: Dec. 21, 1995

[30] Foreign Application Priority Data

Dec. 22, 1994 [FI] Finland ................................. 946049

[51] Int. Cl.$^6$ .................................................. G01F 1/38
[52] U.S. Cl. ................................................ 73/861.48
[58] Field of Search ............................ 73/861.48, 718, 73/724

[56] References Cited

U.S. PATENT DOCUMENTS

| | | | |
|---|---|---|---|
| 4,987,782 | 1/1991 | Shkedi et al. | 73/718 |
| 5,083,091 | 1/1992 | Frick et al. | 73/718 |
| 5,194,819 | 3/1993 | Briefer | 73/718 |
| 5,470,797 | 11/1995 | Mastrangelo | 73/718 |
| 5,515,732 | 5/1996 | Willcox et al. | 73/718 |

FOREIGN PATENT DOCUMENTS 4025883  4/1991  Germany.

Primary Examiner—Richard Chilcot
Assistant Examiner—Jewel Artis

[57] ABSTRACT

The invention relates to a method and apparatus for linearizing a flow velocity sensor based on pressure difference measurement. According to the method, a difference of two pressure signals is measured from the flow under measurement and is proportional to the square of the flow velocity. The pressure difference is measured using a micromechanically manufactured symmetrical capacitive differential pressure sensor based on the force balance principle. The pressure-induced deviation from force balance is compensated for by inducing on the pressure-sensing diaphragm of the differential pressure sensor a force-balance-restoring electrostatic pressure. The amplitude of the force-balance-restoring electrical feedback control signal also acts as the system output signal and is directly proportional to the square root of the difference of the two pressure signals, and thus, a linear function of the flow velocity. According to the invention, the feedback control voltage is a function of the direction of the pressure difference and is applied only to one of the stationary electrodes so that the electrostatic force of attraction thus induced acts counter to the force generated by the pressure difference under measurement, whereby the polarity of the system output voltage signal is dependent on the direction of the flow.

17 Claims, 12 Drawing Sheets

METHOD OF LINEARIZING A FLOW VELOCITY SENSOR, A LINEARIZED FLOW VELOCITY MEASUREMENT APPARATUS AND SYSTEM

The present invention relates to a method for linearizing a flow velocity sensor.

The method also concerns a linearized flow velocity measurement apparatus.

In the flow velocity measurement of gases, the principle of major importance is to measure from the flow a variable called the dynamic pressure which is proportional to the square of the flow velocity. The simplest primary device of this kind is the Pitot tube having two pressure passages for measuring from the flow the kinetic pressure, also called dynamic pressure, which is the difference of total pressure and static pressure. The pressure difference between the openings of the Pitot tube can be expressed by the following formula:

$$\Delta p = \frac{1}{2} \rho \cdot q_{flow}^2 \qquad (1)$$

where $\rho$ is gas density and $q_{flow}$ is flow velocity.

In general, the quadratic form of the equation results from the Bernoulli equation which is a basic formula depicting the dynamics of the flow. For a noncompressible, friction-free flow the above formula can be written in the following form:

$$\frac{p}{\rho} + gh + \frac{q_{flow}^2}{2} = \text{constant} \qquad (2)$$

where g is constant of gravitational acceleration and h is elevation of the pressure ports relative to a given reference level. The equation is valid along any point of a flow line. Flow velocity meters based on Bernoulli's law are available in a variety of different types. The two most important of primary devices in such meters are the Pitot tube and the Venturi, the latter using restriction of flow. The above-described quadratic relationship of the pressure difference also occurs in turbulent flow. Such flow velocity sensors are characterized by the common property that pressure is measured as a pressure differential between two different points of the sensor for the determination of the flow velocity.

However, the quadratic flow velocity-pressure differential relationship in these sensors essentially deteriorates the resolution of measurement when signal conversion is performed using an A/D converter whose resolution is relatively small, e.g., 8 bits.

Known from DE patent application 40 25 883 is an embodiment in which the flow velocity sensor is linearized by means of a capacitive force balance transducer. No sensing method of flow direction is disclosed in the patent publication.

It is an object of the present invention to overcome the disadvantages of the above-described techniques and to provide an entirely novel type of method for linearizing a flow velocity sensor with a particular property of flow direction indication and a linearized, bidirectionally measuring flow velocity measurement apparatus.

The goal of the invention is achieved by virtue of controlling the pressure-sensing diaphragm of a symmetrical capacitive differential pressure sensor into the undeflected position by means of an electrical feedback arrangement, whereby the feedback circuit establishing the force balance state of the sensor performs linearization of the inherently nonlinear pressure sensor output and simultaneously indicates the direction of flow. Advantageously such a pressure sensor is made using silicon micromechanical techniques.

The invention offers significant benefits.

The invention facilitates linear, bidirectional measurement of flow velocity. Also the resolution of flow velocity measurement is improved. Referring to FIG. 10, a graph is shown therein illustrating the output signal response of the linear-flow electronics according to the invention and a conventional electronics circuitry having a linear transfer function with respect to the pressure differential. Particularly at small values of flow velocity, the embodiment according to the invention offers a clearly improved output resolution in bidirectional measurement.

The output signal of the electronics circuitry according to the invention is insensitive to variations in supply voltage and other nonideal conditions. The output signal range is determined by the sensor properties.

In the following the invention will be examined in greater detail with reference to exemplifying embodiments illustrated in the appended drawings in which FIG. 1 is a longitudinally sectional side view of a conventional Pitot tube type of primary device;

When an electric potential difference U is applied between the two electrodes of a capacitor, an electrostatic pressure appears on the surface of the electrodes with a magnitude expressed by the formula:

$$P_{electric} = \frac{\epsilon \cdot U^2}{2 \cdot g^2} \quad (3)$$

where $\epsilon$ is the dielectric coefficient of the gaseous medium between the capacitor electrodes and g is distance between the capacitor electrodes. If the profile of the pressure-sensing diaphragm of the differential pressure sensor is kept nondeflected by means of an electrical feedback arrangement, the force balance state of the sensor is expressed by the formula:

$$\Delta p_{Pitot} = P_{electric} \quad (4)$$

Then, the function expressing the relationship between the feedback voltage signal, that is, the output voltage of the electronics circuitry and the flow velocity is linearized as expressed by the formula:

$$U = \sqrt{\frac{g^2 \cdot \rho}{\epsilon}} \cdot q_{flow} \quad (5)$$

Figure 1:
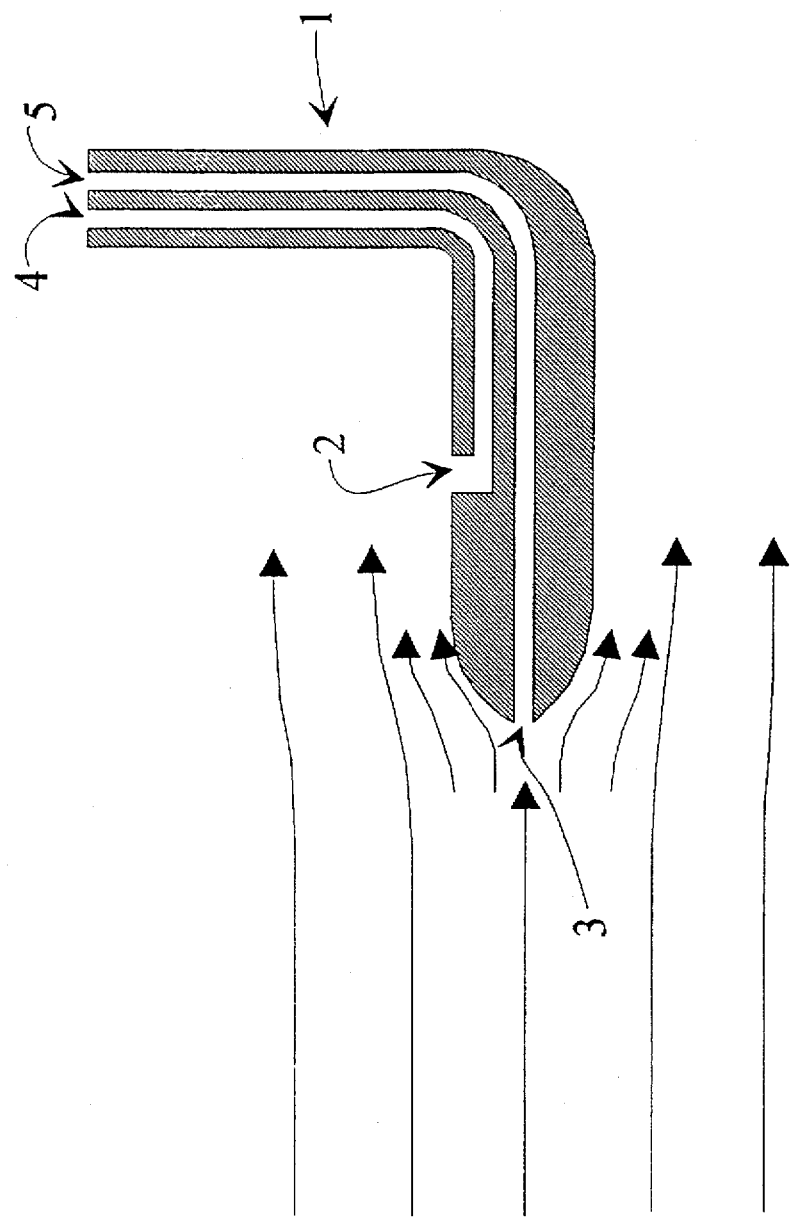

As shown in FIG. 1, a typical application environment for the invention is, e.g., a Pitot tube 1 with its measuring orifice 3 oriented against the flow. The static pressure is obtained from a reference pressure opening 2 and both pressures are taken to outlet ports 4 and 5 for pressure difference measurement. The pressure difference between the outlet ports 4 and 5 is proportional to the square of the flow velocity.

Figure 2:
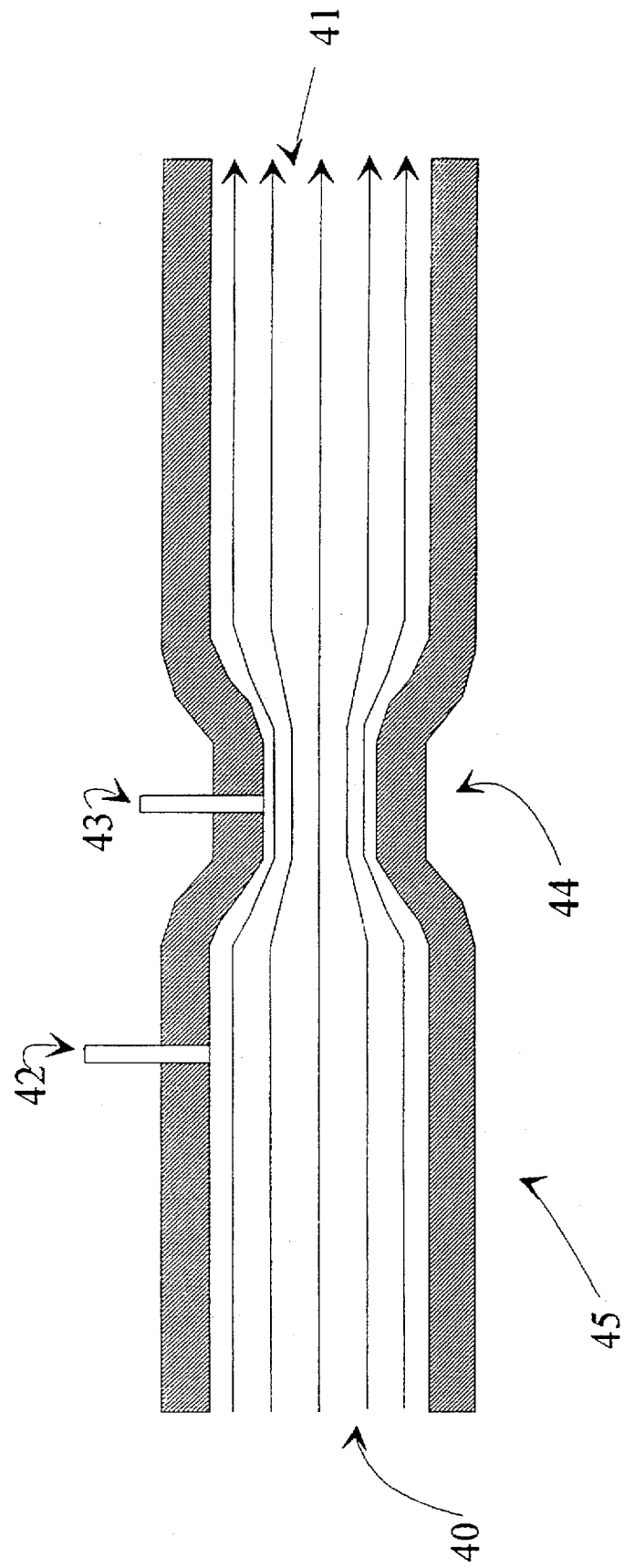
FIG. 2 is a longitudinally sectional side view of a conventional Venturi tube type of primary device.

Now referring to FIG. 2, an alternative primary device is a Venturi tube 45 in which the flow passes from inlet opening 40 to outlet opening 41. Flow velocity is determined by measuring pressure difference between pressure outlets 42 and 43, whereby one pressure outlet 43 is placed in the restricted section 44 of the tube, while the other pressure outlet 42 is in the nonrestricted section of the tube.

Figure 3:
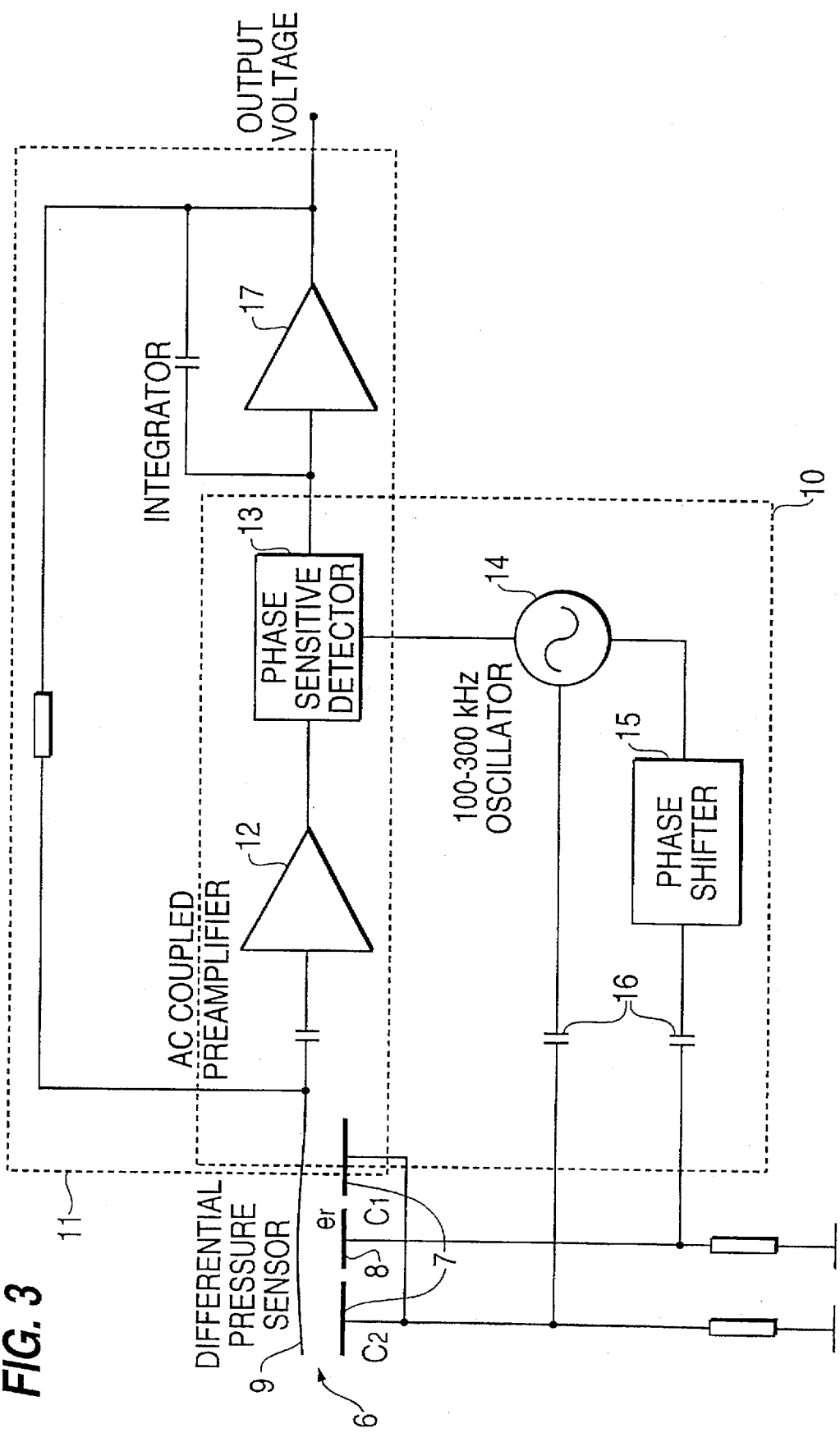
FIG. 3 is a block diagram of an embodiment of an electronics circuitry suited for unidirectional flow measurement with a differential pressure sensor, whose signal is conditioned for a linear response of the flow velocity measurement at the circuit output.

Referring to FIG. 3, the key component in the measurement apparatus is a capacitive differential pressure sensor 6. The sensor element is comprised of at least one stationary electrode which in the illustrated case is divided into two separate electrodes 7 and 8, and of a pressure-sensing conducting diaphragm 9 forming the counterelectrode in the capacitive sensor 6. Shown in FIG. 3 is also a simple exemplifying circuit configuration capable of electronically implementing the quadratic feedback function. In principle, the circuit is comprised of two overlapping blocks, namely, a measurement block 10 which detects the capacitance (charge) of the sensor and a feedback block 11 whose function is to keep the sensor capacitance unchanged. In practice this means that the charge of the sensing diaphragm of the capacitive sensor 6 is kept constant by feedback control. In the two-electrode capacitor configuration shown in the diagram, signals in opposite phases are applied to electrodes 7 and 8 by means of a circuit block comprising an oscillator 14 and a phase inverter 15. Capacitors 16 block signals with frequencies lower than the measurement carrier signal from passing to the electrodes 7 and 8. If the net charge over one cycle of the measurement carrier signal applied to the electrode of the diaphragm 9 is zero, the sensor 6 is in force balance and no signal is passed to the high-pass filtered input of amplifier 12. In other words, while the electrode of diaphragm 9 in the force balance state may carry a static charge or its charge may vary at a low frequency charge, the measurement block 10 detects charge changes occurring at the measurement carrier frequency only. If the diaphragm 9 of the sensor 6 is forced to deflect, a charge component varying at the measurement carrier frequency will be imposed on the capacitor electrode of the diaphragm 9, whereby an AC signal will be passed to the input of amplifier 12. This signal is rectified and low-pass filtered in a phase-sensitive amplifier 13 and passed therefrom to the input of integrator 17. The output signal of the integrator 17 is applied as a feedback signal to the electrode of diaphragm 9 of sensor 6 thus opposing its flexure. The feedback signal generates an electrostatic force of attraction between the moving electrode of the sensing diaphragm 9 and the stationary electrodes 7 and 8. In the force balance state the output signal of integrator 17 is simultaneously also a measurement signal with a linear response to the flow velocity. In practice, the attraction force generated by the measurement carrier signal causes a small offset error, which may be compensated for by the offset adjustment of the integrator 17.

Figure 4:
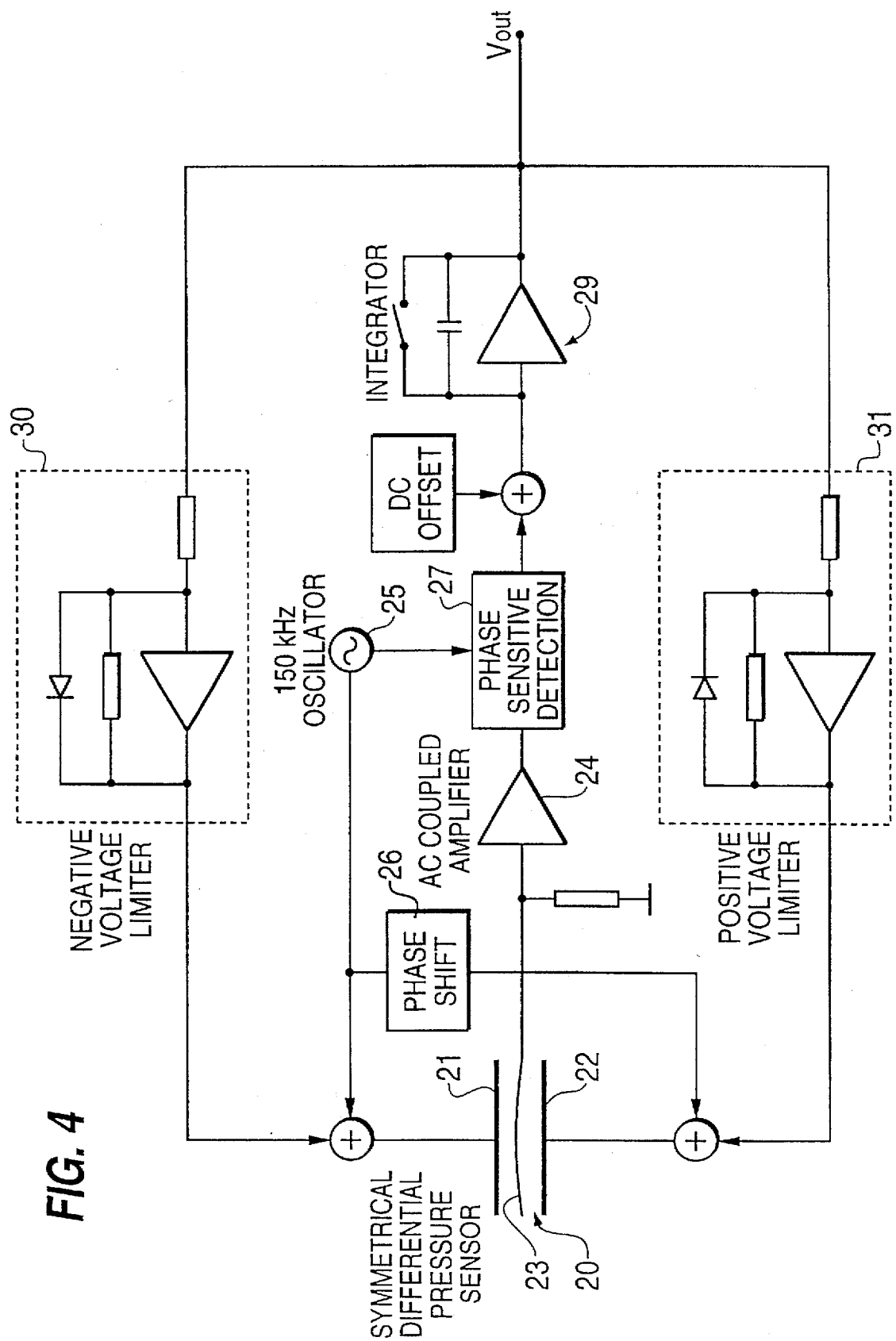
FIG. 4 is a block diagram of an embodiment according to the invention of an electronics circuitry suited for bidirectional flow measurement with a differential pressure sensor, whose signal is conditioned for a linear response of the flow velocity measurement at the circuit output.

Referring to FIG. 4, an embodiment of an electronic measurement circuit configuration is shown capable of using a symmetric differential pressure sensor 20 for bidirectional flow velocity measurement so that a linear output signal response vs. flow velocity is achieved. A symmetrical differential pressure sensor 20 comprises a stationary top electrode 21, a stationary bottom electrode 22 and a conducting sensing diaphragm 23 which is arranged to deflect under applied pressure and is disposed between the stationary electrodes so as to form the center electrode of the sensing capacitor. It should be noted that the directional references (top and bottom) made above are related to the orientations of the diagram only. In practice, the sensor 20 may be mounted in any position. Analogously with the embodiment shown in FIG. 3, also the embodiment illustrated in FIG. 4 is based on measuring the net charge imposed by the measurement carrier signal on the electrode of the diaphragm 23 of the sensor 20 and controlling the net charge to a zero value in order to keep the profile of the diaphragm 23 exactly constant, advantageously flat. If the net charge imposed by the measurement carrier signal deviates from the zero value, an input signal will be applied to the amplifier 24 and amplified therein. The input signal results from the measurement carrier signal applied from oscillator 25 to the top electrode 21 and the bottom electrode 22 only if the phase-inverted carrier signals impose a nonzero net charge on the moving electrode of the diaphragm 23. A phase inverter 26 is used to apply the measurement carrier signal in opposite phase on the bottom electrode 22 with respect to the measurement carrier signal applied on the top electrode 21. The sensor output signal resulting at the carrier frequency in a deflection state of the diaphragm deviating from force balance will be rectified and low-pass filtered in a phase-sensitive detector 27, if necessary offset-corrected by an offset correction circuit and taken to the input of an integrator 29. The feedback force can be generated bidirectionally depending on the polarity of the output signal of integrator 29. Hence, depending on the output signal polarity of the integrator 29, the feedback signal is applied with the help of limiter circuits 30 and 31 only to either of the stationary electrodes 21 and 22 of the sensor. The limiter circuits 30 and 31 comprise, e.g., an operational amplifier with a resistor and a diode parallel connected on its feedback loop. For example, if the sensing diaphragm 23, which is taken to the ground potential, tends to deflect downward under pressure, the feedback circuit applies a positive voltage to the top electrode that pulls the sensing diaphragm 23 into a position in which the net charge on the diaphragm electrode 23 is controlled to zero, whereby the force balance state of the system is restored. Thus, the output of integrator 29 provides a voltage signal which is a linear function of flow velocity. If so desired, the electrodes 21 and 22 may be divided into two or more subelectrodes as shown in FIG. 3.

Figure 5:
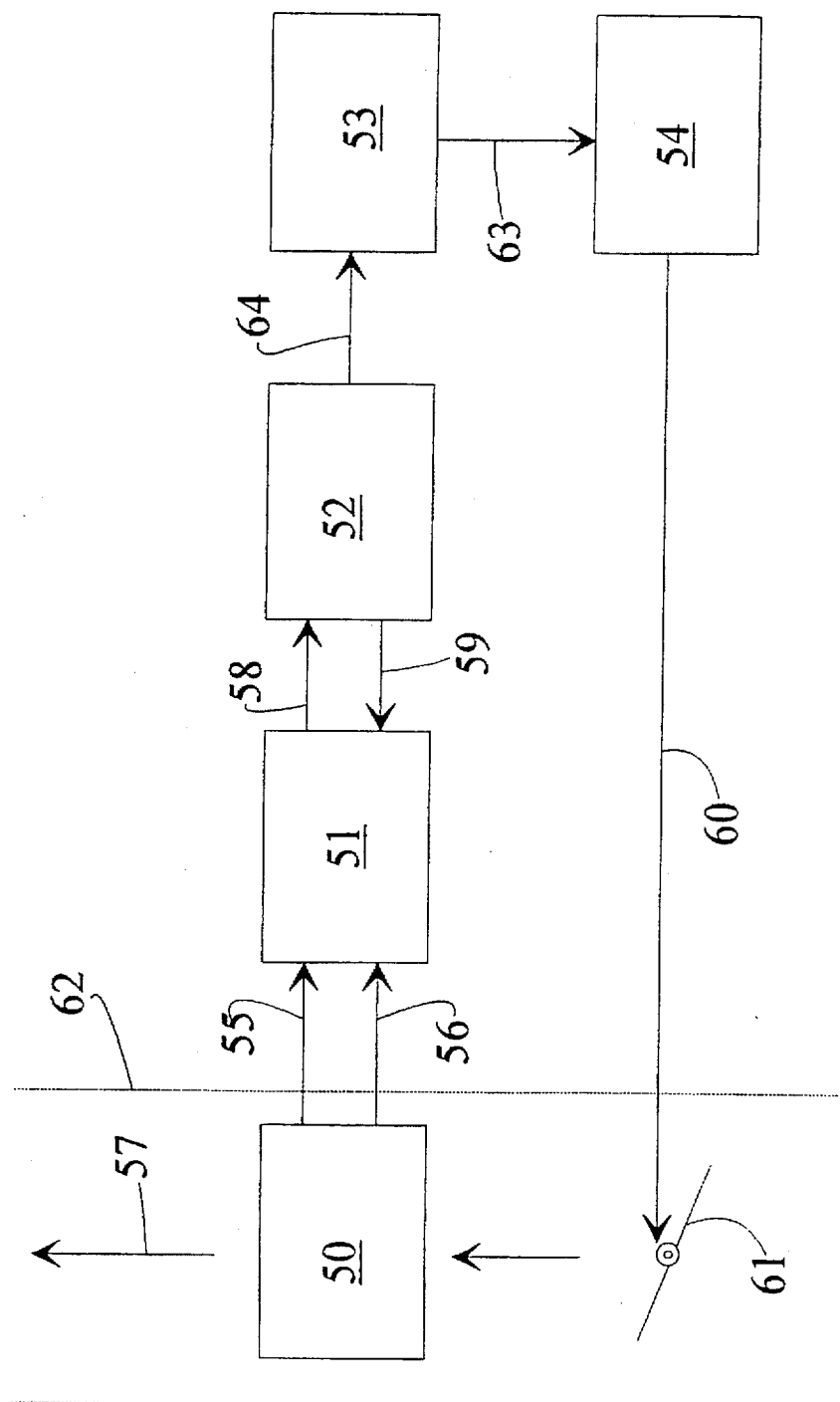
FIG. 5 is a block diagram of a complete system suited for an application of the method and apparatus according to the invention.
Figure 6:
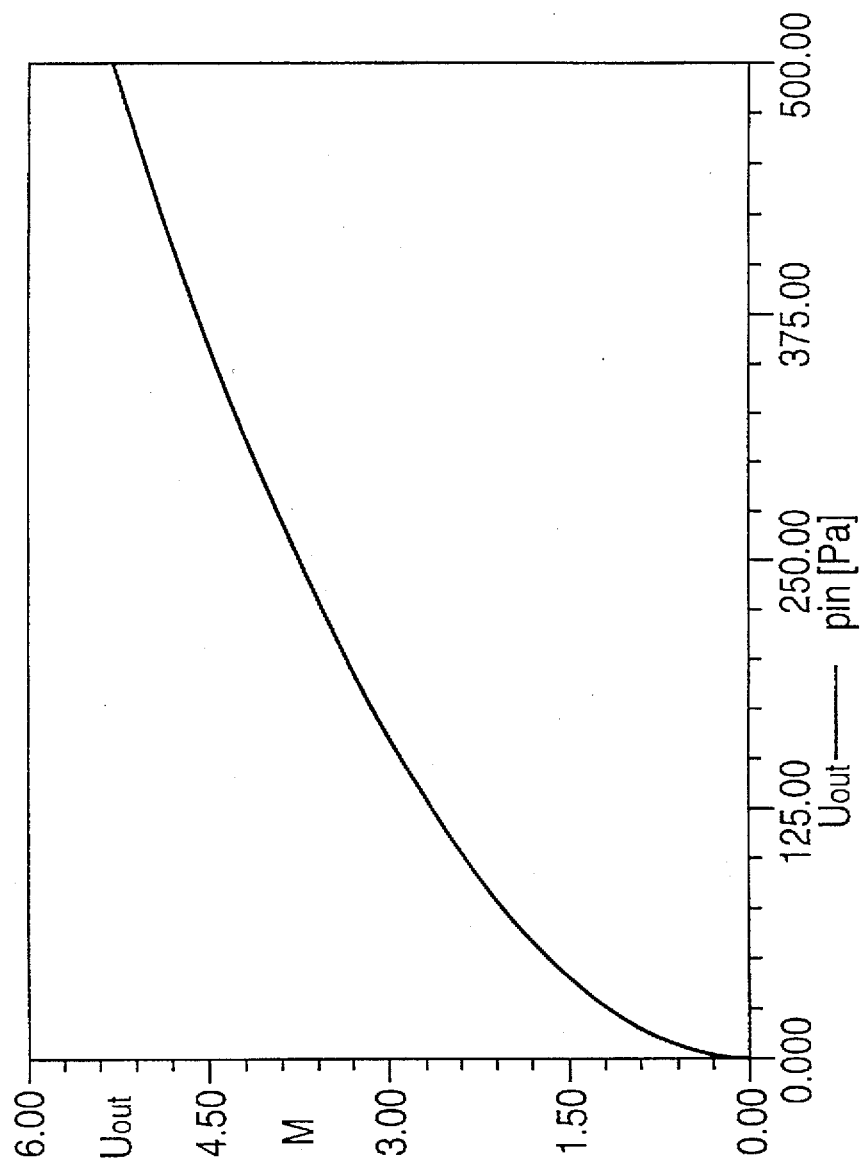
FIG. 6 is a graph illustrating the output voltage of an electronics circuitry for of unidirectional measurement according to the invention as a function of the differential pressure when the spacing of the measuring capacitor openings in the sensor is 0.5 µm.
Figure 7:
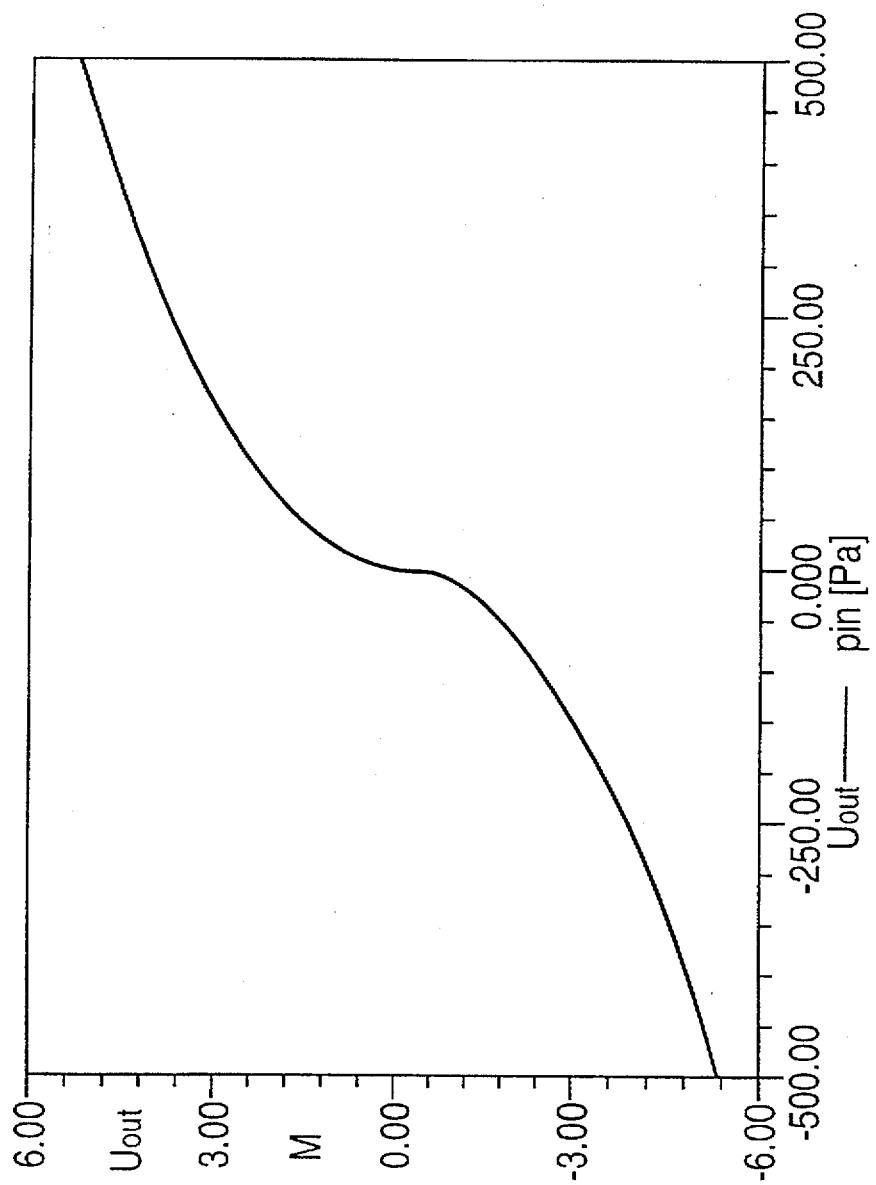
FIG. 7 is a graph illustrating the output voltage an electronics circuitry for bidirectional measurement according to the invention as a function of the differential pressure when the spacing of the measuring capacitor openings of the sensor is 0.5 µm.
Figure 8:
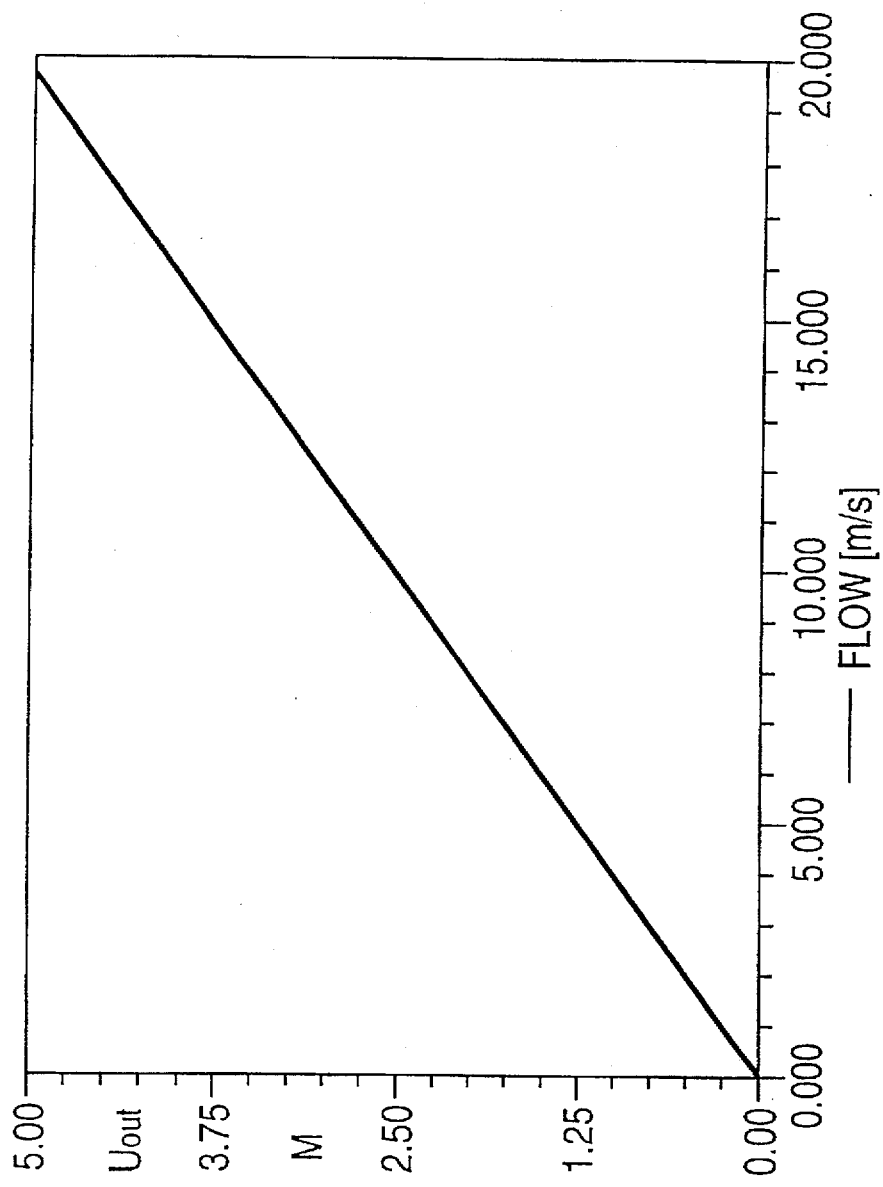
FIG. 8 is a graph illustrating the output voltage of the apparatus according to the invention as a function of flow velocity.
Figure 9:
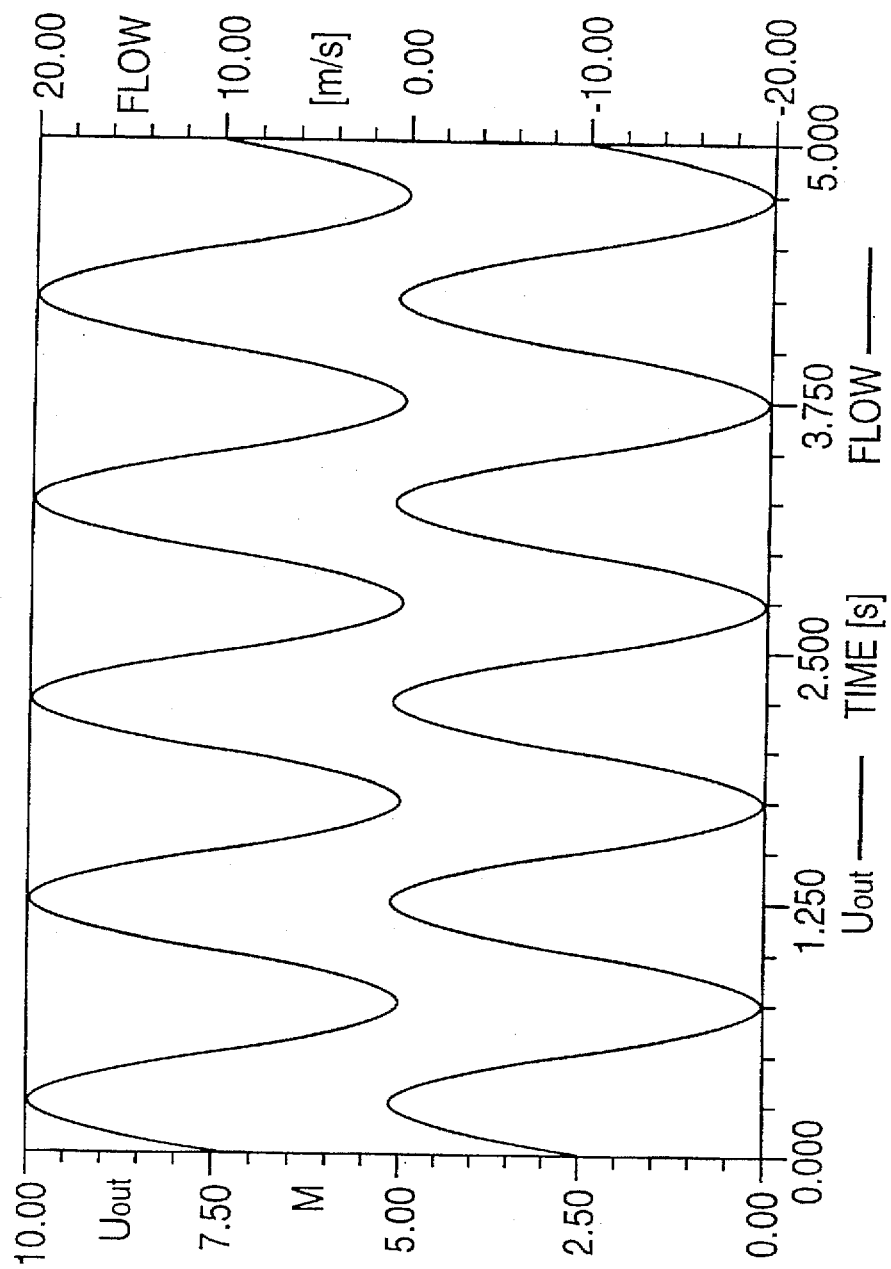
FIG. 9 is a graph illustrating the output voltage of the apparatus according to the invention and corresponding flow velocity as a function of time.
Figure 10:
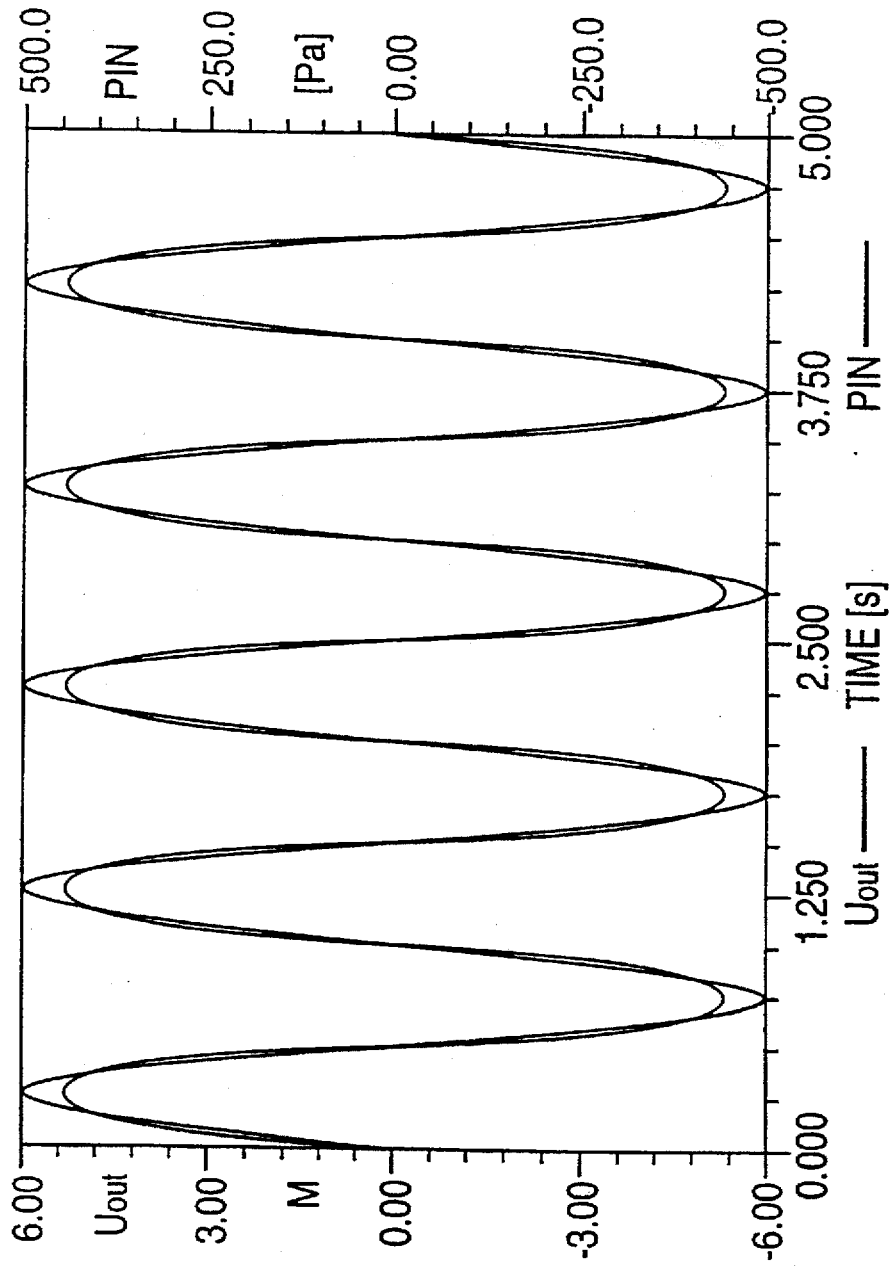
FIG. 10 is a graph illustrating the output voltage of the apparatus according to the invention and a sinewave differential pressure input signal as a function of time.

Referring to FIG. 5, the arrangement shown therein has both a primary device 50 (e.g., a Pitot or Venturi tube) for flow velocity measurement and a flow-restricting control plate 61 disposed in a flow pipe 62. The pressures from the two outlet ports 55 and 56 of the flow velocity sensing primary device are connected to a differential pressure sensor 51, in which the position signal 58 of the pressure sensing diaphragm of the sensor is detected by means of a measurement and control circuit block 52, and according to the detected deflection of the sensing diaphragm, the diaphragm position is feedback-controlled 59 by applying an electrostatic force of attraction to one side of the sensing diaphragm only as earlier discussed in conjunction with the description of FIGS. 3 and 4. From the control circuit 52, the output voltage signal 64 which also acts as the feedback control signal is taken to an A/D converter 53, whose digital output signal 63 is further taken to a microprocessor 54 adapted to control the flow rate in the flow pipe. For this purpose, the microprocessor 54 further steers a control plate 61 adapted to restrict the total flow rate in the flow pipe 62. Such a system may be applied to air-conditioning equipment, for instance. Other input signals to the flow-controlling microprocessor 54 may be, e.g., air temperature, relative humidity or concentration of a desired gas component.

Instead of the DC feedback configuration described above, the arrangement according to the invention may alternatively use a pulsed amplitude-modulated feedback circuit configuration.

In a preferred embodiment of the invention, a nonsymmetrical pressure sensor 6 intended for use in the system has a design in which the stationary electrodes 7 and 8 have at least approximately equal surface areas. Furthermore, also the stationary electrodes 21 and 22 of a symmetrical pressure sensor 20 may be divided into two subelectrodes with approximately equal surface areas.

In FIGS. 4–10 are shown graphs illustrating the performance of the embodiment according to the invention.

Figure 11:
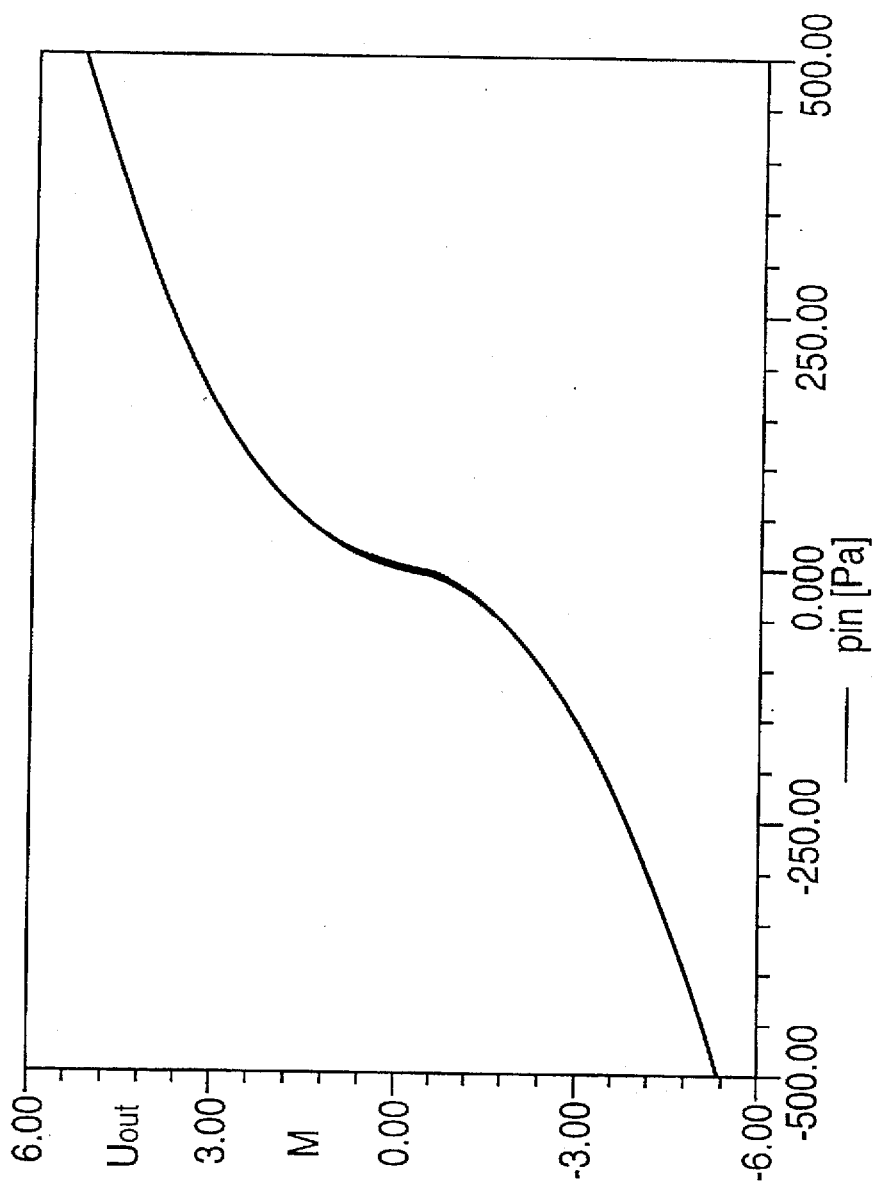
FIG. 11 is a graph illustrating the output voltage of the apparatus according to the invention as a function of a large-amplitude sinewave differential pressure input signal oscillating at 1 Hz.
Figure 12:
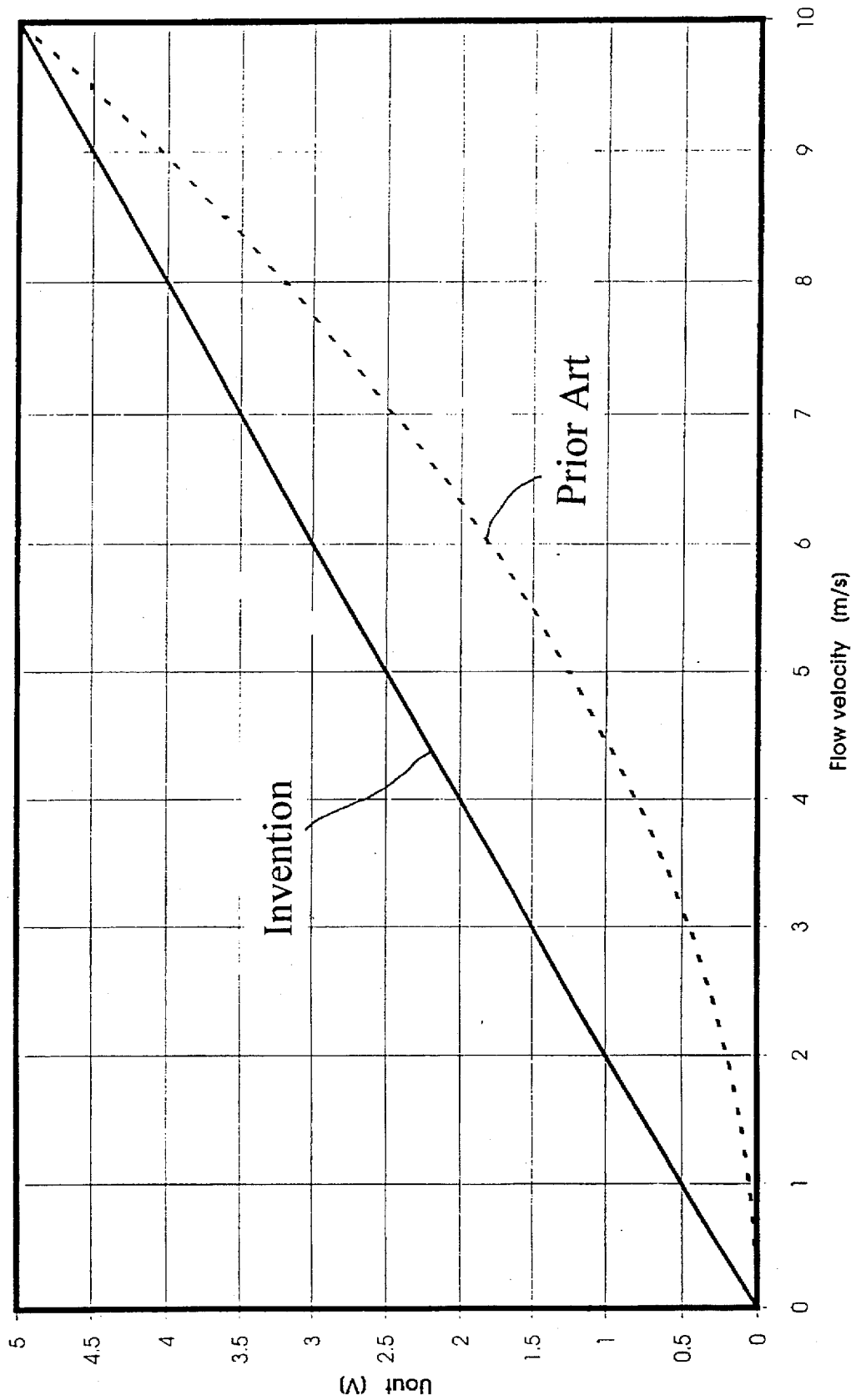
FIG. 12 is a graph showing a comparison of the output voltage-flow velocity relationship for a conventional apparatus with an apparatus according to the invention.

In the graph shown in FIG. 11, the ill-defined behaviour of the graph about the origin of the graph is related to a system transfer function singularity point at infinity.

I claim:

1. A method of linearizing a flow velocity sensor based on pressure difference measurement comprising the steps of:
    obtaining two pressure signals generated from the flow under measurement the difference between the two pressure signals being proportional to the square of the flow velocity;
    measuring the difference of said two pressure signals using a symmetrical capacitive differential pressure sensor which receives the obtained two pressure signals and includes a sensing diaphragm disposed between two electrodes, the sensing diaphragm deviating from a force balance state by deflecting toward one of the two electrodes to indicate a difference between said two pressure signals; and
    compensating for a pressure-induced deviation from force balance state by inducing a force-balance-restoring electrostatic pressure on the sensing diaphragm of said differential pressure sensor, the amplitude of the force-balance-restoring signal also acting as the measurement output signal and being directly proportional to the square root of said difference of said two pressure signals, and thus, a linear function of the flow velocity, wherein, depending on the direction of the pressure difference, said force-balance-restoring signal is applied only to one of the stationary electrodes so that the electrostatic force of attraction acts counter to the force induced by the pressure difference under measurement, and wherein the polarity of the measurement output signal is dependent on the direction of the flow.

2. A method as defined in claim 1, wherein the force balance state of the sensing diaphragm is achieved by feeding the differential pressure sensor with an AC measurement signal, measuring a pressure-induced change of charge on the sensing diaphragm, and feedback-controlling the position of the sensing diaphragm with the applied electrostatic force of attraction to a position in which the change of charge induced by the AC measurement signal on said sensing diaphragm is minimized.

3. A method as defined in claim 1, wherein the compensation for pressure induced deviation is implemented with a DC signal applied between said sensing diaphragm and at least one stationary electrode.

4. A method as defined in claim 1, wherein the compensation for pressure induced deviation is implemented with an amplitude-modulated pulsed signal applied between said sensing diaphragm and at least one stationary electrode.

5. A linearized flow velocity measurement apparatus, comprising:
    a flow velocity sensor disposed in the flow under measurement, said flow velocity sensor having two pressure outlet ports such that the pressure difference between the two pressure outlet ports is proportional to the square of the flow velocity;
    a symmetrical capacitive differential pressure sensor coupled to said flow velocity sensor to receive the outputs of the two pressure outlet ports, said differential pressure sensor including a sensing diaphragm disposed between two stationary electrodes for converting the pressure difference between the pressure outlet ports into an electrical measurement signal by sensing a deviation of the sensing diaphragm from a force balance state, said differential pressure sensor receiving a feedback control signal proportional to the square root of the pressure difference between said two pressure outlet ports; and
    feedback control voltage generating circuitry including limiter circuits for selectively applying the feedback control voltage to the stationary electrodes of said differential pressure sensor so that the feedback control signal is applied to only one electrode at a time.

6. An apparatus as defined in claim 5, further comprising:
    means for feeding the differential pressure sensor with an AC measurement signal;
    means for measuring the pressure-induced change of charge of the sensing diaphragm; and
    feedback control means for feedback-controlling the sensing diaphragm into a stable position in which said change of charge induced by said measurement signal on said sensing diagram is minimized.

7. An apparatus as defined in claim 5, wherein said feedback control circuitry is capable of applying a DC control voltage between said sensing diaphragm and said stationary electrodes.

8. An apparatus as defined in claim 5, wherein said feedback control circuitry is capable of applying a pulsed amplitude-modulated control voltage between said sensing diaphragm and said stationary electrodes.

9. An apparatus as defined in claim 5, wherein the surface areas of said stationary electrodes are essentially equal.

10. A flow velocity measurement system comprising:

a pressure source for obtaining two pressure levels from the flow being measured;

a capacitive pressure sensor coupled to said pressure source for receiving the two pressure levels, said capacitive pressure sensor having a first electrode, a second electrode, and a sensing diaphragm disposed between the first and second electrodes, the sensing diaphragm reacting to a difference between the two pressure levels by deflecting toward either the first electrode or the second electrode thereby creating a measurement signal indicative of flow velocity; and a feedback control unit for applying a feedback charge signal to said capacitive pressure sensor to restore the sensing diaphragm to a non-deflected position, the feedback charge being sent to only one of the first and second electrodes depending on whether the difference between the two pressure levels caused the diaphragm to deflect toward the first electrode or the second electrode.

11. The system of claim 10, wherein the feedback charge signal also acts as the measurement result of said flow velocity measurement system.

12. The system of claim 10, wherein the deflection direction of the sensing diaphragm is determined by the flow direction of the flow being measured.

13. The system of claim 10, further comprising:

a measurement carrier signal source for providing an AC measurement carrier signal to each of the first and second electrodes of said capacitive pressure sensor; and a phase invertor, disposed between the measurement carrier signal source and the second electrode, for making the AC measurement carrier signal provided to the second electrode phase inverted relative to the AC measurement carrier signal provided to the first electrode.

14. The system of claim 10, further comprising:

a phase sensitive detector for determining, based on the phase characteristics of the measurement signal created by said capacitive pressure sensor, the direction of diaphragm deflection and outputting a rectified signal with a polarity that reflects the direction of sensing diaphragm deflection.

15. The system of claim 14, wherein the feedback unit includes:

a first feedback loop for selectively providing the feedback charge to the first electrode based on the polarity of the signal output by said phase sensitive detector; and a second feedback loop for selectively providing the feedback charge to the second electrode based on the polarity of the signal output by said phase sensitive detector.

16. The system of claim 15 wherein said first and second feed back loops each include a limiter circuit for selectively passing the feedback charge to the first and second electrodes depending on the polarity of the feedback signal so that only one of the first and second electrodes receives the feedback charge.

17. The system of claim 10, wherein the first and second electrodes each include two stationary sub-electrodes.

* * * * *